US005235933A

United States Patent [19]

Paré et al.

[11] Patent Number: 5,235,933

[45] Date of Patent: Aug. 17, 1993

[54] INDICATOR DEVICE

[76] Inventors: Robert Paré, 40 Lafayette Street, Gatineau, Quebec, Canada, J8P 2T7; Mervin Stanzel, 12 Laurentide Road, Nepean, Ontario, Canada, K2H 6T5; Richard Waddell, R.R. #1 Gleason Road, Almonte, Ontario, Canada, K0A 2H0; Allan Weatherall, 3 Ready Way, Nepean, Ontario, Canada, K2J 2R7

[21] Appl. No.: 986,385

[22] Filed: Dec. 7, 1992

[51] Int. Cl.⁵ .................................... G01D 5/12

[52] U.S. Cl. .................................... 116/204

[58] Field of Search .................... 116/85, 86, 100, 204, 116/215, 200; 232/34, 35, 37; 40/459, 492, 907

[56] References Cited

U.S. PATENT DOCUMENTS

| | | | |
|---|---|---|---|
| 823,782 | 3/1904 | Holden | 116/215 |
| 2,002,725 | 5/1935 | Wyatt et al. | 40/459 |
| 2,730,298 | 1/1956 | Haserodt | 232/35 |
| 3,343,784 | 9/1967 | Waldhaus et al. | 232/35 |
| 3,516,036 | 1/1969 | Lea | 116/85 X |
| 3,698,352 | 10/1972 | Forman | 116/86 |
| 3,915,112 | 10/1975 | Forester | 116/204 X |
| 4,040,381 | 8/1977 | Keogh, Sr. et al. | 116/200 X |
| 4,316,575 | 2/1982 | Van Darwarka | 232/35 |
| 4,401,050 | 8/1977 | Britt et al. | 116/205 |
| 4,567,846 | 2/1986 | Kurtz | 116/100 X |
| 4,702,411 | 10/1987 | Yager | 232/35 |
| 4,840,307 | 6/1989 | Hartman | 232/35 |
| 4,899,683 | 2/1990 | Cuffaro | 116/215 |
| 4,976,214 | 12/1990 | Lee et al. | 116/204 X |

FOREIGN PATENT DOCUMENTS

| | | | |
|---|---|---|---|
| 0686137 | 1/1953 | United Kingdom | 116/86 |

*Primary Examiner*—William A. Cuchlinski, Jr.
*Assistant Examiner*—John L. Beres
*Attorney, Agent, or Firm*—Michael A. Mann

[57] ABSTRACT

There is described an improved device for indicating the status of a room or adjoining space, the device including first and second plates hingedly connected to one another along adjacent edges thereof, a spring urging the second plate into a normally closed position overlying and parallel to the first plate to the surface of a door. A magnet or equivalent devices are used to temporarily connect the second plate to a second surface, such as a door frame, adjacent to and extending at an angle to the surface of the door, wherein relative movement of the door away from the second surface breaks the connection between the second plate and the second surface, whereupon the second plate automatically returns to its normally closed position.

8 Claims, 2 Drawing Sheets

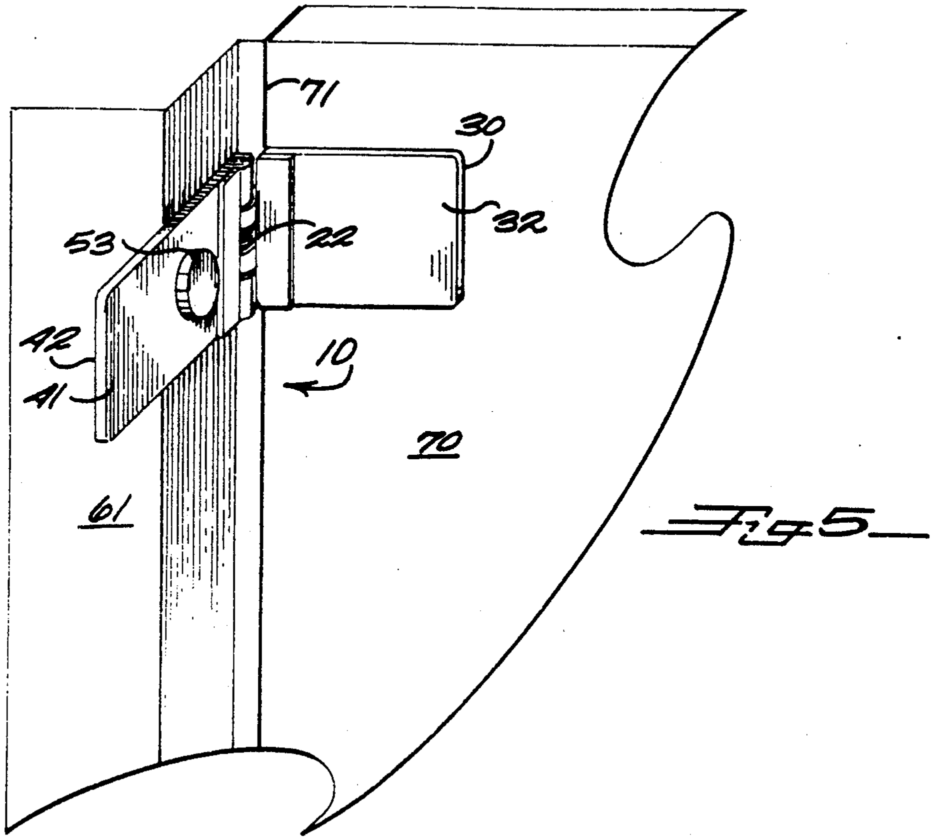
Fig 5
Fig 2
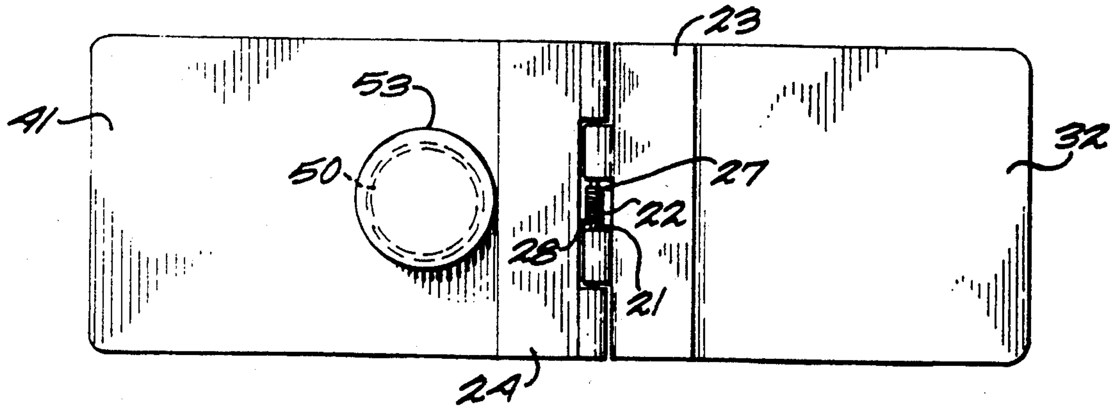

INDICATOR DEVICE

FIELD OF THE INVENTION

The present invention relates to status indicating signs, and more particularly to an indicator sign which attaches to a door and its door frame which can easily be engaged to readily show that a certain status exists in the space on the other side of the doorway.

BACKGROUND OF THE INVENTION

It is frequently necessary that the status of a room be monitored for one reason or another, and to then provide a visual indication that the status check has been completed. A typical example is in the event of an emergency in a hospital, home for the aged or chronic care facility requiring the evacuation of the premises. Obviously, in such facilities, not all of the occupants will be ambulatory and will therefore be incapable of evacuating themselves. Evacuation assistance for such patients is necessary and it is equally necessary that all patient rooms be double-checked to ensure that their occupants have in fact been safely removed. The task of double-checking is assigned to predetermined individuals who do their rounds as quickly but as thoroughly as possible. As each room is checked, its door is then closed and marked to confirm to others that the room has been inspected and confirmed vacant. The marking of the door serves not only to confirm room status but to prevent others from duplicating the room check unnecessarily.

Presently, one can indicate that a search has been conducted beyond a closed door by writing directly on the door, placing a temporary sign on the door, or engaging a sign permanently affixed to the door. These systems all have certain disadvantages. Writing on the door is easiest. However, if one uses a non-permanent writing instrument which is easily removed, such as chalk, the markings can be erased, obscured or washed away unintentionally. If one uses a permanent writing instrument, such as an indelible ink marker, one must go through the effort and expense of washing or even painting the door once the emergency is over. There are also the problems of having sufficient writing instruments on hand at all times and of making sure the instruments write on all surfaces of all doors that one would encounter in a large building. Shiny, wet or damaged surfaces may be particularly difficult to write upon.

Signs that temporarily attach to a doorway once an inspection is complete pose their own particular problems. One must initially locate and carry the signs from door to door and there is always the possibility of having insufficient signs to mark all necessary rooms and areas. The means of attaching these signs to the doors may prove inadequate, particularly in emergency situations. There are problems involving the use of tape or the use of signs having an adhesive backing for attachment purposes. Tape or other adhesives do not always adhere well to all surfaces, especially shiny, wet or cold surfaces or surfaces made dirty or even damaged as a result of the emergency. In such a case, signs may not adhere at all or may fall off prematurely once the area beyond them has been inspected. While these problems may in some instances be overcome by using stronger adhesives, residue of such adhesives may remain on the surface of the door once the sign has been removed following the emergency, or removal of the sign may cause damage to the door's surface.

Indicators permanently attached to a door overcome the abovementioned problems. However, not all permanent indicator signs are convenient to use and must in any event be manually reset after the emergency is over and the patients are returned to their rooms. This has serious implications while the emergency remains in progress. If, following the inspection and setting the sign accordingly, someone reenters the room, closing the door behind them, the room will nevertheless appear confirmed-as-vacant to the outside observer. Injury or tragedy may ensue if the person in the room subsequently fails to leave due to disorientation, confusion, disablement or injury.

The present indicator sign has the advantage of automatically resetting itself when the door is next opened after the inspection. If the inspection was associated with an evacuation, the present invention has the added advantage of being able to indicate whether someone has reentered the room, subsequent to an inspection, thereby indicating that another inspection is needed.

SUMMARY OF THE INVENTION

In a preferred embodiment, the present invention provides a permanent indicator sign which is affixed to the outer surface of a door, at the lateral edge of the door hinged to the door frame. The indicator sign comprises at least two plates, the first being affixed to the outer face of the door by some permanent or semi-permanent fastening means, the second plate being attached to the first plate by means of a spring hinge located on the edge of the first plate proximal to the hinged edge of the door. The spring-hinge biases the two plates into a normally closed position in which the second plate overlies the first much like a book cover.

Affixed to, or embedded in the second plate, is a magnet. Similarly affixed to, or embedded in the door frame, is another magnet at a location on the door frame such that when the second plate is swung about the spring hinge to a position where the outer surface of the second plate is coincident with the surface of the door frame, the two magnets come into contact to hold the second plate in an open position relative to the first plate.

Obviously, the attractive forces between the two magnets must be stronger than the closing force exerted by the spring-hinge so that the indicator sign will be held in the open position with the inner surface of the second plate and the outer surface of the first plate exposed.

Opening the door causes the two magnets to pull away from one another to the point where the tension within the spring-hinge exceeds the attractive force between the magnets. The spring hinge will therefore close as the door is opened, automatically returning the sign to its closed position.

Alternatively, both the frame and the second plate need not have magnets embedded therein. It is sufficient to have one of the two contain a magnet so long as the other is made of a material that is attracted to the magnet.

According to the present invention, then, there is provided a device for indicating the status of a room or adjoining space, comprising first and second plates hingedly connected to one another along adjacent edges thereof, spring means urging said second plate into a normally closed position overlying and parallel to said first plate, first means to connect said first plate to a first surface, and second means for temporarily connecting said second plate to a second surface adjacent to and extending at an angle to said first surface, wherein relative movement of said first surface away from said second surface breaks the connection between said second plate and said second surface, whereupon said second plate automatically returns to said normally closed position thereof.

BRIEF DESCRIPTION OF THE DRAWINGS

Preferred embodiments of the present invention will now be described in greater detail and will be better understood when read in conjunction with the following drawings in which:

FIG. 2 is a front elevational view of the indicator sign of FIG. 1 in a fully opened position;

FIG. 5 is a perspective view of the indicator sign of FIG. 3 in the normally open position thereof, with the second plate magnetically attached to a door frame.

DESCRIPTION OF THE PREFERRED EMBODIMENTS

Figure 1:
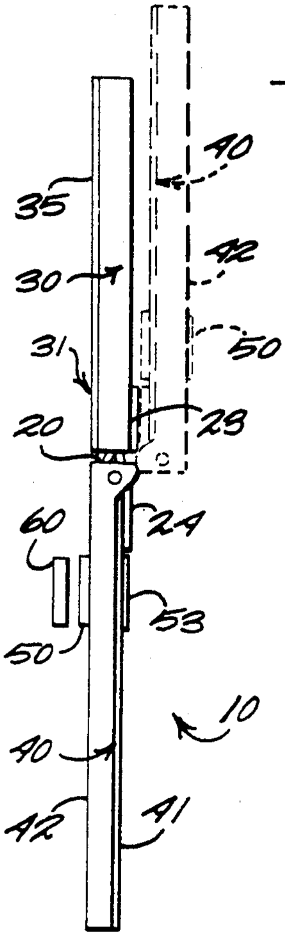
FIG. 1 is a plan view of the indicator sign in a fully opened position.
Figure 3:
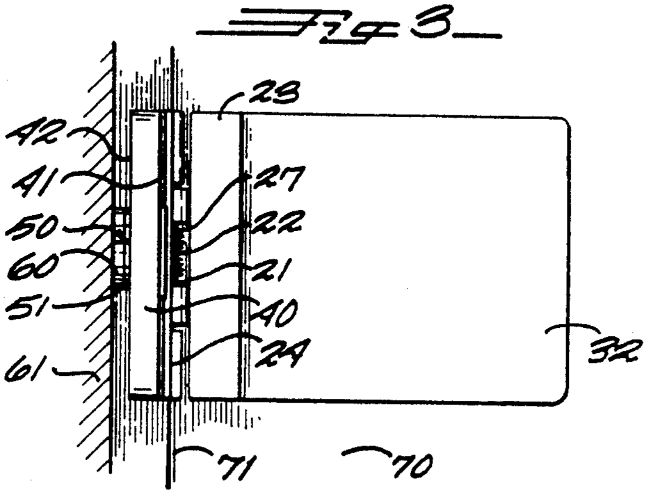
FIG. 3 is a front elevational view of the indicator sign of FIG. 1 in a normally-opened position.

With reference to FIG. 1, indicator sign 10 comprises a spring hinge 20 connected between a first plate 30, which attaches to the outer surface of a door 70 (FIG. 5), and a second plate 40 which, in the embodiment shown, includes a magnet 50. Hinge 20 normally biases plates 30 and 40 into a closed position as shown in FIG. 1 in dotted lines. Magnet 50 in second plate 40 may be used to secure second plate 40 to a door frame 61, as illustrated in FIGS. 3 and 5. If the door frame is made of a material to which a magnet attaches, such as steel, a second magnet 60 in the door frame itself, as illustrated in FIG. 3, is not necessary. If the door frame is made of non-magnetic material such as wood, a second magnet 60, as illustrated in FIG. 3, is necessarily embedded in the door frame, in order to secure the indicator sign in the open position as shown in FIG. 5.

Each of plates 30 and 40 is typically flat and rectangular in outline, although other shapes are certainly possible. The plates are made of any suitable material, such as metal or plastic; the chosen material preferably being heat and flame resistant. Plate 40 is at least as large as plate 30 to completely cover the latter when the indicator sign is in the closed position thereof as shown in FIG. 4.

To attach plate 30 to the outer surface of door 70, a fastening means must be utilized. As illustrated in FIG. 1, an adhesive strip 33 is laminated to rear surface 31 of plate 30 such that an adhesive surface 35 of strip 33 can be exposed and used to secure sign 10 to the outer surface of door 70. Alternative fastening means may be used, including screws or even a mounting bracket fastened to the door into which plate 30 may be slidably received.

Figure 4:
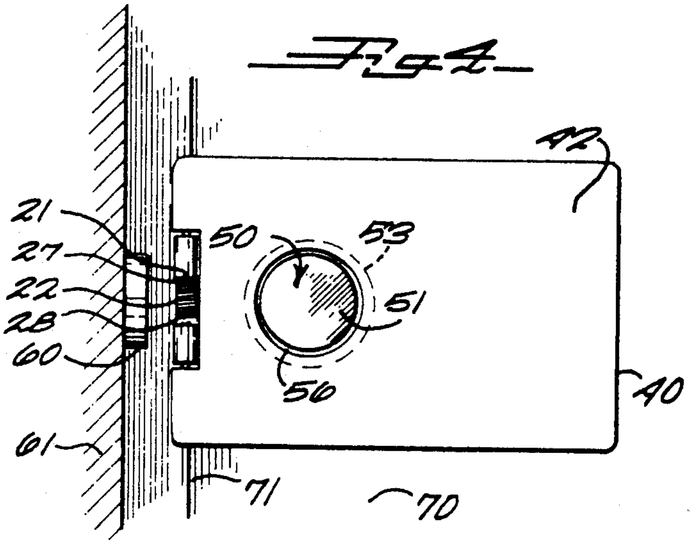
FIG. 4 is a front elevational view of the indicator sign of FIG. 1 in a normally closed position.

With reference to FIGS. 1 and 4, magnet 50 is attached to plate 40 to expose magnetic surface 51 for connection to magnet 60 in door frame 61, or to the door frame itself if made of magnetic material. Magnet 50 may be attached to outer surface 42 of plate 40 such as by means of glue or threaded fasteners. Alternatively, as shown in the drawings, magnet 50 includes a disc-shaped flange 53 secured to its rear surface 55. The diameter of flange 53 exceeds the diameter of the magnet to provide an overhang. An aperture 56 is formed through plate 40, the diameter of the aperture being the same as or slightly smaller than the diameter of magnet 50. The magnet is then inserted through aperture 56 so that the overhanging portion of disc 53 overlies and abuts the inner surface 41 of plate 40. If aperture 56 is slightly smaller than the outer diameter of magnet 50, the resulting friction fit will hold the magnet in place. Otherwise, or to reinforce the friction fit, some glue may be applied between the overhang and surface 41.

As aforesaid, plates 30 and 40 are connected to one another by means of a spring-hinge 20, any number of which are commercially available and need not be described in further detail herein. Means of connection of the hinge to the two plates will also be self-evident to those skilled in the art and a description of the connection is therefore also omitted.

It is desirable that sign 10 be fairly inconspicuous when not in use. To this end, outer surface 42 of plate 40, and the protruding portions of magnet 50, may be of the same colour as the outer surface of door 70. On the other hand, when in use, the exposed surfaces of the sign should preferably contrast sharply with door 70. Obviously therefore inner surface 41 of plate 40 and outer surface 32 of plate 30 should be a different contrasting colour compared to the colour of door 70. The colour contrast between the inner and outer surfaces of plates 30 and 40 may be accomplished by means of, for example, differences in pigmentation, or by means of applying different coloured foils to the surfaces in question or forming plates 30 and 40 by laminating multiple layers having different colours.

With reference to FIG. 5, sign 10 is mounted onto door 70 adjacent an edge 71 of the door hinged to a frame 61. When not in use, plate 40 will be biased by hinge 20 into a normally closed position overlying plate 30 and will not interfere in the normal opening and closing of the door. When it is desired to engage the sign to indicate that the adjoining room has been checked, the door is closed, and plate 40 is then pivoted about hinge 20 to temporarily engage frame 61, assuming the frame is itself magnetic, or an appropriately-positioned magnet 60 sunk into or otherwise attached to frame 61, if the latter is non-magnetic. Opening the sign in this way exposes surfaces 41 and 32 which, if of a contrasting colour relative to door 70, improves the sign's visibility to reinforce the indication of the room's inspected status. As will be appreciated, the mere deployment of the sign in the open condition itself is confirmation of the room's prior inspection.

When door 70 is reopened, plate 40 and magnet 40 are drawn away from the door frame, and this relative movement between the door frame and the door breaks the connection between magnets 50 and 60 (or door frame 61, as the case may be) and plate 40 snaps shut into its normally closed position overlying plate 30.

As will be appreciated, the present device can also be situated along the same edge of the door as the door handle. This location can be slightly more obtrusive however, and result in a louder snapping sound when the door is opened unless an impact absorbing pad or buffer is provided on one of the opposing surfaces of plates 30 and 40.

The use of magnets to hold the plate 40 in its opened position is exemplary only. Other means may be used, such as opposing sections of hook-and-loop fastening material like VELCRO, spring clips or injection-moulded closing mechanisms such as frequently used, for example, or plastic closures for bottles containing powders, liquids and the like. It is merely necessary that whatever mechanism is used exerts a restraining force on plate 40 sufficient to overcome the closing force applied by spring hinge 20.

We claim:

1. A device for indicating the status of a room or adjoining space, comprising:

first and second plates hingedly connected to one another along adjacent edges thereof;

spring means urging said second plate into a normally closed position overlying and parallel to said first plate;

first means to connect said first plate to a first surface; and second means for temporarily connecting said second plate to a second surface adjacent to and extending at an angle to said first surface, wherein relative movement of said first surface away from said second surface breaks the connection between said second plate and said second surface, whereupon said second plate automatically returns to said normally closed position thereof.

2. The device of claim 1 wherein said second means comprise a magnet supported by said second plate.

3. The device of claim 2 wherein each of said first and second plates has an inner and outer surface, the inner surface of said second plate facing the outer surface of said first plate when said second plate is in the normally closed position thereof.

4. The device of claim 3 the colour of said outer surface of said second plate is the same as or similar to the colour of said first surface.

5. The device of claim 4 wherein the colour of said inner surface of said second plate and the outer surface of said first plate contrasts with the colour of said first surface.

6. The device of claim 5 wherein said first surface is the surface of a door adjacent one of the vertical edges thereof.

7. The device of claim 6 wherein said second surface is the surface of a door frame adjacent said edge of said door where said first plate is connected thereto.

8. The device of claim 7 wherein said first connecting means comprises adhesive strips adapted to connect said first plate to said first surface.

* * * * *